United States Patent [19]
Rollins et al.

[11] Patent Number: 4,931,765
[45] Date of Patent: Jun. 5, 1990

[54] UNITIZED HOUSING FOR SILENT AND TONE PAGER ALERTING SYSTEM

[75] Inventors: Thomas J. Rollins, Boca Raton; Charles W. Mooney, Lake Worth; Tuan K. Nguyen, Boca Raton, all of Fla.

[73] Assignee: Motorola, Inc., Schaumburg, Ill.

[21] Appl. No.: 308,288

[22] Filed: Feb. 9, 1989

[51] Int. Cl.⁵ .............................................. G08B 5/00
[52] U.S. Cl. ............................... 340/407; 340/384 R; 340/391; 340/693; 340/825.46; 381/205
[58] Field of Search ............... 340/407, 388, 394, 404, 340/384 R, 384 E, 391, 693, 825.44–825.48; 181/159, 160, 148, 157, 150, 189, 190; 381/205; 116/142 R

[56] References Cited

U.S. PATENT DOCUMENTS

| | | | |
|---|---|---|---|
| 3,623,064 | 11/1971 | Kagan | 340/825.46 |
| 4,149,153 | 4/1979 | Shigemori et al. | 340/388 |
| 4,163,223 | 7/1979 | Sato et al. | 340/388 |
| 4,175,262 | 11/1979 | Harakawa et al. | 340/388 |
| 4,286,257 | 8/1981 | Slauin et al. | 340/388 |
| 4,392,135 | 7/1983 | Ohyagi | 340/825.46 |
| 4,413,253 | 11/1983 | Hofer et al. | 340/388 |
| 4,823,110 | 4/1989 | Dorward et al. | 340/388 |

Primary Examiner—Donnie L. Crosland
Attorney, Agent, or Firm—William E. Koch; Vincent B. Ingrassia

[57] ABSTRACT

A housing for an alerting system within a selective call radio receiver exhibits substantial space saving characteristics by incorporating both a low profile vibrator motor for silent alerting and a tone generator for audio alerting. The housing comprises a rigid material defining first and second chambers adjacent and separated by a common wall of the housing, the first chamber containing the low profile vibrating motor, the second chamber containing the tone generator, the housing defining a first port therein for omitting an audio tone from the second chamber and at least one other port therein for providing power to the low profile vibrating motor and the tone generator.

27 Claims, 2 Drawing Sheets

UNITIZED HOUSING FOR SILENT AND TONE PAGER ALERTING SYSTEM

FIELD OF THE INVENTION

This invention relates in general to selective call radio receivers with selectable silent or tone alerting and, more particularly, to a radio pager having a unitary housing within the case of the pager, the housing exhibiting substantial space saving characteristics by incorporating both a low profile vibrator motor for silent alerting and a tone generator for audio alerting.

BACKGROUND OF THE INVENTION

Radio pagers having selectable silent or tone alerting are known in the art. Typically, a vibrator motor alerts the wearer of the pager in the silent mode. Conventional vibrator motors comprise a cylindrical housing wherein a rotating shaft having a longitudinal axis of significant length to which an external but unbalanced counter weight is attached. "Significant length" means that the rotating shaft is equal to or greater than the diameter of the motor. This previously known type of vibrator motor is relatively large and severely restricts the commercially desired reduction in size of pagers.

Previously known tone alerting systems, i.e., transducer, piezo, or speaker, were conventionally located apart from the vibrator motor. This also restricted the reduction in size of the pager by requiring two separate housing systems for the vibrating motor and the tone alerting system.

Thus, what is needed is a radio pager having a unitary housing exhibiting substantial space saving characteristics by incorporating both a low profile vibrator motor for silent alerting and an tone generator for audio alerting.

SUMMARY OF THE INVENTION

Accordingly, it is an object of the present invention to provide an improved selective call radio receiver.

Another object of the present invention is to provide a unitary housing exhibiting substantial space saving characteristics within a selective call radio receiver by incorporating both a low profile vibrator motor for silent alerting and a tone generator for audio alerting.

In carrying out the above and other objects of the invention in one form, there is provided an alerting system, for inclusion within a low volume electronic device such as a radio pager, including a low profile vibrating motor, a tone generator, and a housing comprising a rigid material defining first and second chambers, the first and second chambers being adjacent and separated by a common wall of the housing, the first chamber containing the low profile vibrating motor, the second chamber containing the tone generator, the housing defining a first port therein to the second chamber for omitting an audio tone from the second chamber and at least one other port therein for providing power to the low profile vibrating motor and the tone generator.

The above and other objects, features, and advantages of the present invention will be better understood from the following detailed description taken in conjunction with the accompanying drawings.

DETAILED DESCRIPTION OF THE INVENTION

Figure 1:
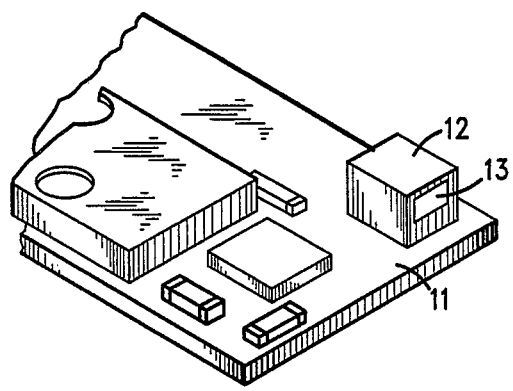
FIG. 1 is a partially broken away view in perspective of a circuit board that is placed inside the radio pager including the unitary housing that contains a vibrator motor and tone generator in accordance with the present invention.

Referring to FIG. 1, a circuit board 11 that is placed inside a selective call radio receiver such as a radio pager includes a unitary housing 12 having a sound port 13 for allowing sound produced inside unitary housing 12 to exit through a port in the case of the radio pager (not shown). Although the unitary housing 12 is illustrated as a box, any shape, i.e., a cylinder, may be used.

Figure 2:
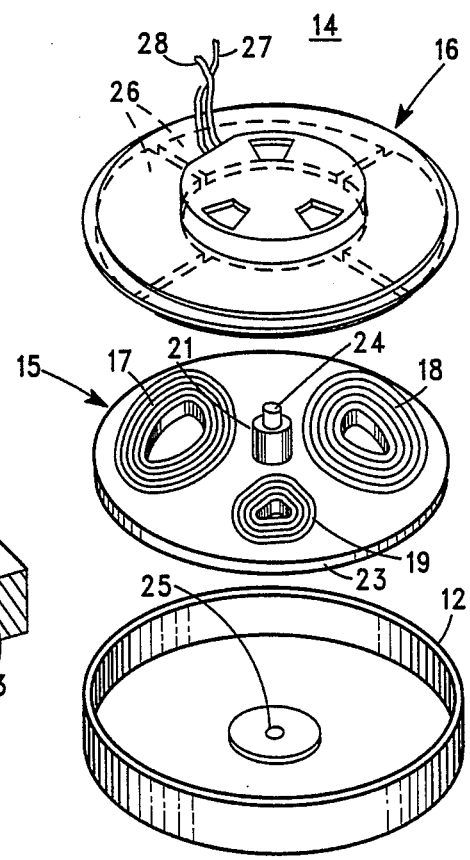
FIG. 2 is an exploded view in perspective of the vibrator motor.
Figure 3:
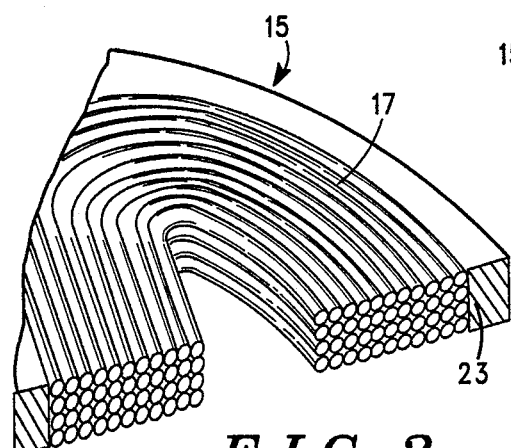
FIG. 3 is an enlarged view in perspective of a portion of the rotor of the vibrator motor.

Referring to FIGS. 2 and 3, one embodiment of a vibrating motor 14, that is disclosed in U.S. patent application Ser. No. 202,331 assigned to the Assignee of this invention, is illustrated in cylindrical form and includes an annular rotor assembly 15 and a stator assembly 16, which also forms a portion of the housing 12. Rotor assembly 15 includes a plurality of electromagnetic windings 17, 18, and 19, arranged about an armature 21 which are partially encapsulated by a suitable thermal plastic material to form a flat disk 23 (see FIG. 3). Shaft 24 of rotor assembly 15 is rotatably accommodated within bearing 25 included in housing 12. The top of shaft 24 fits into a similar bearing (not specifically shown) in the stator assembly 16. Stator 16 includes a plurality of curved permanent magnets shown in dotted lines at 26. Stator 16 also includes the brush apparatus 20 (FIG. 4) for cooperation with armature 21. Alternatively, the plurality of magnets 26 could be located on the rotor assembly 15 and the electromagnetic windings 17, 18 and 19 could be located on the stator assembly 16.

Motor 14 operates in an entirely conventional manner. Operating power, or more specifically, current, is supplied to the d-c brush apparatus 20 via wiring or leads 27 and 28 and from there to armature 21 which selectively applies current to windings 17, 18, and 19. An electromotive force is created in conjunction with the magnetic flux effected by magnets 26 and the motor operates at a predetermined operational speed.

Figure 4:
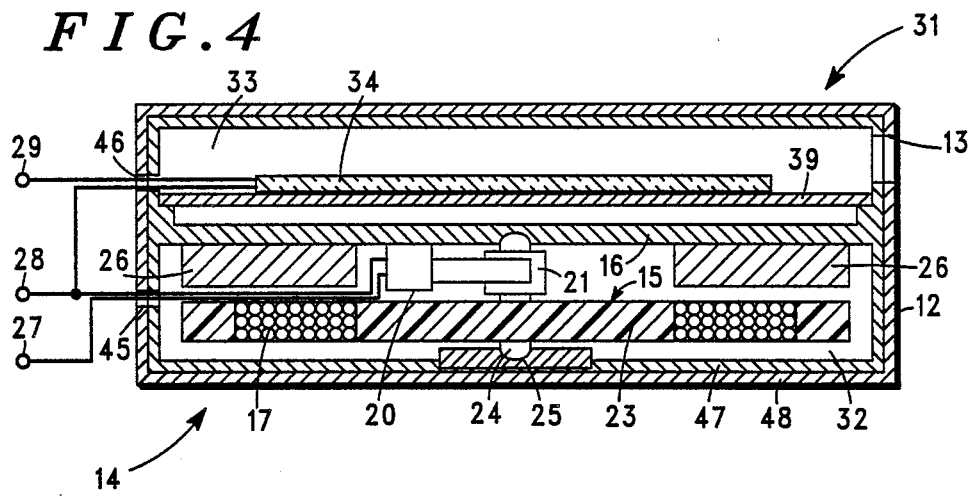
FIG. 4 is a cross-sectional view of the vibrator motor and a piezo tone generator within the unitary housing.
Figure 5:
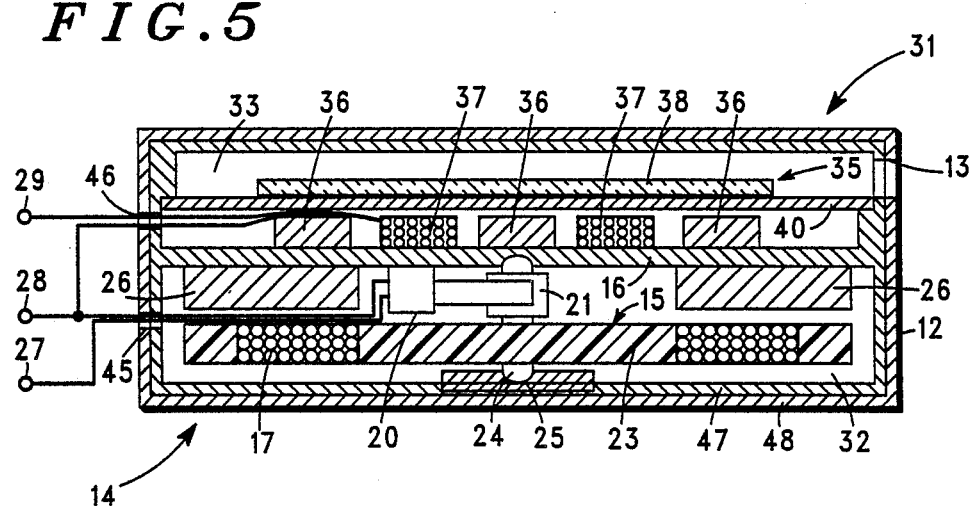
FIG. 5 is a cross sectional view of the vibrator motor and a transducer tone generator within the unitary housing.
Figure 6:
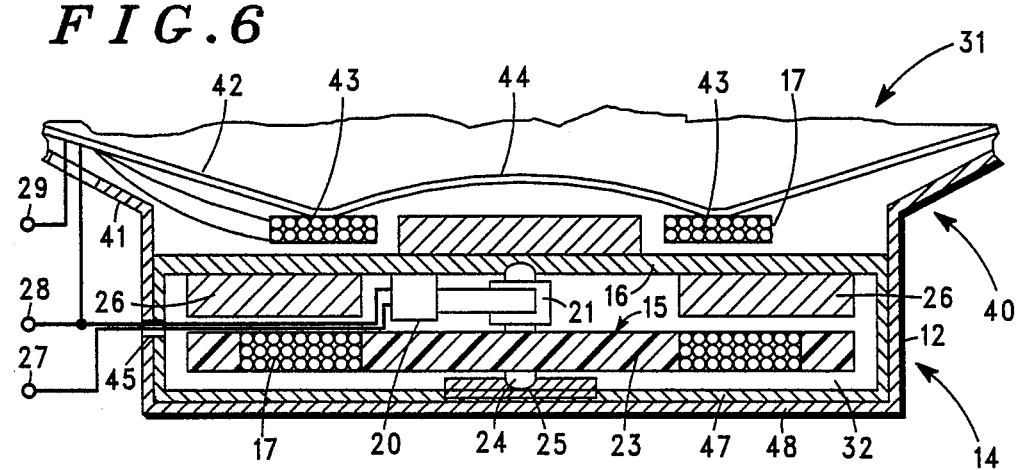
FIG. 6 is a cross sectional view of the vibrator motor within the unitary housing and a speaker as an integral part of the unitary housing.

Referring to FIGS. 4-6, vibrating motor 14 and tone generator 31 are located in chambers 32 and 33, respectively, of housing 12. The tone generator 31 may comprise any one of a number of known types of tone generators, such as a piezo material 34 and a transducer 35 shown in FIGS. 4 and 5, respectively, that generates a tone through port 13 or a speaker 40 shown in FIG. 6 that generates a tone away from the frame 12 in response to electrical signals applied to terminals 27 and 28 or 28 and 29. Chamber 33 comprises a Hemholtz resonating cavity that amplifies the vibrating sound of the tone generator 31.

Housing 12 comprises an inner portion 47 comprising a Nu metal material that effectively prevents any magnetic field created by motor 14 and tone generator from escaping chambers 32 and 33, respectively, and outer portion 48 comprising a magnesium alloy for microphonic damping of unwanted spurious vibration.

The piezo material 34 illustrated in FIG. 4 is disposed on metal strip 39 located over motor 14 on frame 12. The transducer illustrated in FIG. 5 includes magnets 36, coil 37, and transducer material 38 disposed on metal strip 40. The speaker illustrated in FIG. 6 includes a frame 41 integral with housing 12 Membrane 42 is flexibly attached between frame 41 and magnet 43. Magnet 43 has a dome 44 attached across the diameter, and windings 17 encasing it's outer circumference. These tone generators 31 all operate in a manner known to those skilled in the art.

Figure 7:
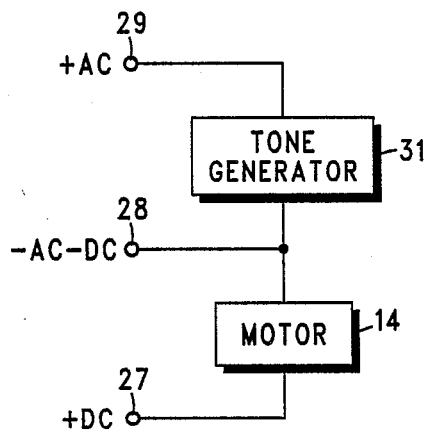
FIG. 7 is a block diagram of the tone generator and vibrator motor.

Referring to FIG. 7, a wiring diagram or schematic is shown having the vibrating motor 14 coupled between terminals 27 and 28 for selectively receiving a d-c voltage and the tone generator 31 coupled between terminals 28 and 29 for selectively receiving an a-c voltage. The conductors 27, 28 and 29 would enter housing 12 through an otherwise sealed port 45 into chamber 32, for example. Conductors 27 and 28 are coupled to brush apparatus 20 and conductors 28 and 29 would enter chamber 33 through an otherwise sealed port 46 for coupling to tone generator 31.

By now it should be appreciated that there has been provided a radio pager having a unitary housing exhibiting substantial space saving characteristics by incorporating both a low profile vibrator motor for silent alerting and a tone generator for audio alerting.

We claim:
1. An electrical component, comprising:
    a housing defining a first chamber, said first chamber having a wall;
    a low profile vibrating motor located in said first chamber, said low profile vibrating motor selectively providing a substantially silent vibration to said housing;
    a tone generator contiguous to said wall, said wall interposed between said first chamber and said tone generator, said housing having a first port therein for providing power to said low profile vibrating motor.
2. The electrical component according to claim 1 wherein said housing defines a second chamber having said said tone generator located therein, said housing having a second port therein for providing power to said tone generator and a third port therein for emitting an audio tone from said second chamber.
3. The electrical component according to claim 2 wherein said housing and said first and second chambers are cylindrical in shape and have a common axis, the dimension along the axis of said first chamber being substantially less than the dimension across its diameter.
4. The electrical component according to claim 3 comprising first and second conductors for providing a d-c voltage to said low profile vibrating motor and said second conductor and a third conductor for providing an a-c voltage to said tone generator.
5. The electrical component according to claim 1 wherein said low profile vibrating motor comprises:
    a shaft coupled to said housing;
    a rotor assembly rotatably coupled to said shaft and having a longitudinal dimension along said shaft less than its lateral dimension across the diameter of said rotor assembly, said rotor assembly being unbalanced so as to develop a substantial vibrating action when rotated at its intended operating speed;
    a stator assembly coupled to said shaft;
    magnet means; and
    a plurality of electromagnetic windings positioned on one of said rotor and stator means with said magnet means positioned on the other.
6. The electrical component according to claim 5 wherein said plurality of electromagnetic windings are positioned on said rotor assembly, said rotor unbalance being effected by at least one of said windings being substantially different in size and weight than the other windings.
7. The electrical component according to claim 5 wherein said magnet means is positioned on said rotor assembly, said rotor unbalance being effected by a substantially uneven distribution of said magnetic means.
8. The electrical component according to claim 5 wherein said tone generator comprises a piezo material.
9. The electrical component according to claim 5 wherein said tone generator comprises a transducer.
10. The electrical component according to claim 1 wherein said tone generator comprises a speaker.
11. The electrical component according to claim 1 wherein said housing comprises:
    an inner portion substantially surrounding said first chamber comprising a material that substantially prevents a magnetic field from passing therethrough; and
    an outer portion mating with said inner portion and opposite from said first chamber for microphonic damping of spurious vibrations.
12. The electrical component according to claim 11 wherein said inner portion comprises a Nu metal.
13. The electrical component according to claim 11 wherein said outer portion comprises a magnesium alloy.
14. The electrical component according to claim 2 wherein said housing comprises:
    an inner portion substantially surrounding said first and second chambers comprising a material that substantially prevents a magnetic field from passing therethrough; and
    an outer portion mating with said inner portion and opposite from said first and second chambers from said inner portion for microphonic damping of spurious vibrations.
15. The electrical component according to claim 14 wherein said inner portion comprises a Nu metal.
16. The electrical component according to claim 14 wherein said outer portion comprises a magnesium alloy.
17. An alerting system, for inclusion within a low volume electronic device such as a selective call radio receiver or a radio pager, comprising:
    vibrating means for selectively effecting a substantially silent vibration;
    a tone generator; and
    a housing comprising a rigid material defining first and second chambers, said first and second chambers being adjacent and separated by a common wall of said housing, said first chamber containing said vibrating means, said housing being selectively vibrated by said vibrating means, said second chamber containing said tone generator, said housing defining a first port therein to said second chamber for emitting an audio tone from said second chamber and at least one other port therein for providing power to said vibrating means and said tone generator.

18. The alerting system according to claim 17 comprising first, second and third conductors for transmitting said power through said at least one other port, said first and second conductors providing a d-c voltage to said vibrating means and said second and third conductors providing an a-c voltage to said tone generator.

19. The alerting system according to claim 18 wherein said housing and said first and second chambers are cylindrical in shape and have a common axis, the dimension along the axis of said first chamber being substantially less than the dimension across its diameter.

20. The alerting system according to claim 18 wherein said vibrating means comprises:
a shaft coupled to said housing;
a rotor assembly rotatably coupled to said shaft and having a longitudinal dimension along said shaft substantially less than its lateral dimension across the diameter of said rotor assembly, said rotor assembly being unbalanced so as to develop a substantial vibrating action when rotated at its intended operating speed;
a stator assembly coupled to said shaft;
magnet means; and
a plurality of electromagnetic windings positioned on one of said rotor and stator means with said magnet means positioned on the other.

21. The alerting system according to claim 20 wherein said plurality of electromagnetic windings are positioned on said rotor assembly, said rotor unbalance being effected by at least one of said windings being substantially different in size and weight than the other windings.

22. The alerting system according to claim 20 wherein said magnet means is positioned on said rotor assembly, said rotor unbalance being effected by a substantially uneven distribution of said magnetic means.

23. The alerting system according to claim 17 wherein said tone generator comprises a piezo material.

24. The alerting system according to claim 17 wherein said tone generator comprises a transducer.

25. The electrical component according to claim 17 wherein said housing comprises:
an inner portion substantially surrounding said first and second chambers comprising a material that substantially prevents a magnetic field from passing therethrough; and
an outer portion mating with said inner portion and opposite from said first and second chambers from said inner portion for microphonic damping of spurious vibrations.

26. The electrical component according to claim 25 wherein said inner portion comprises a Nu metal.

27. The electrical component according to claim 25 wherein said outer portion comprises a magnesium alloy.

* * * * *